UNITED STATES PATENT OFFICE.

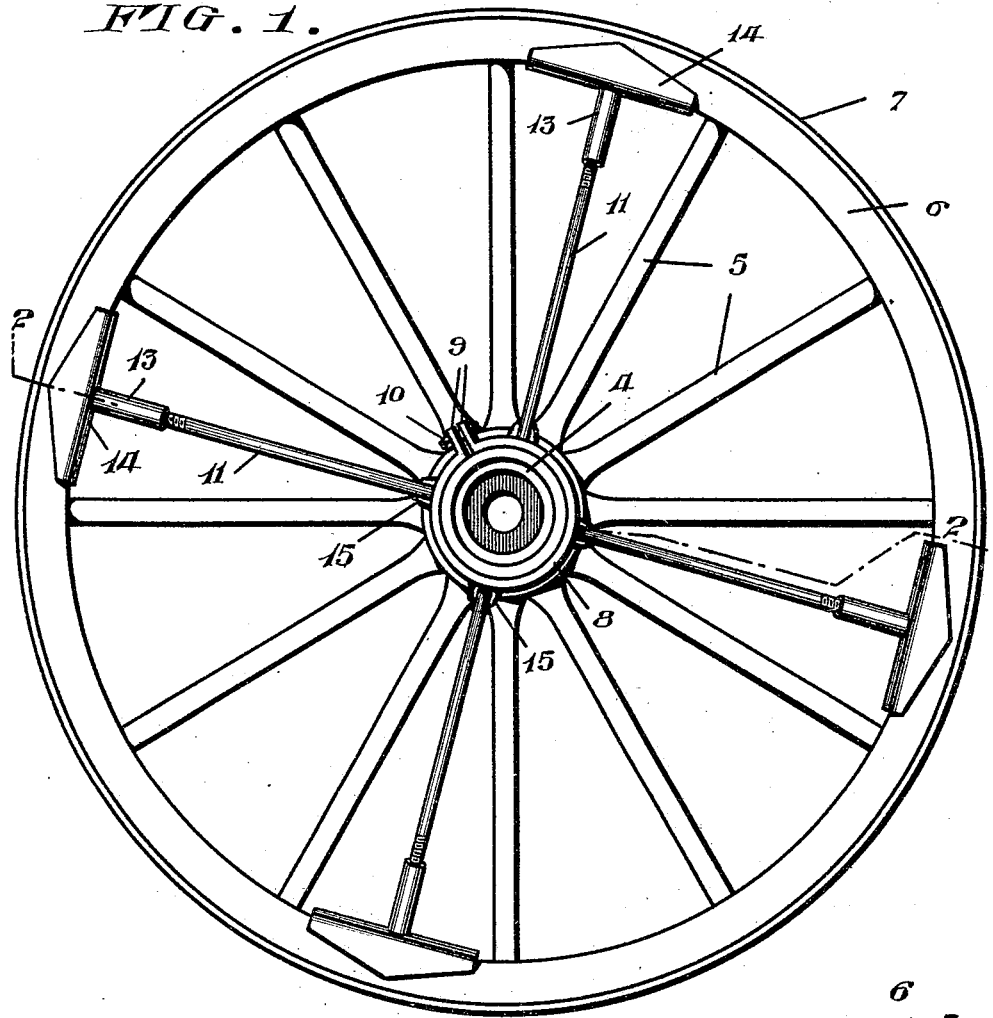
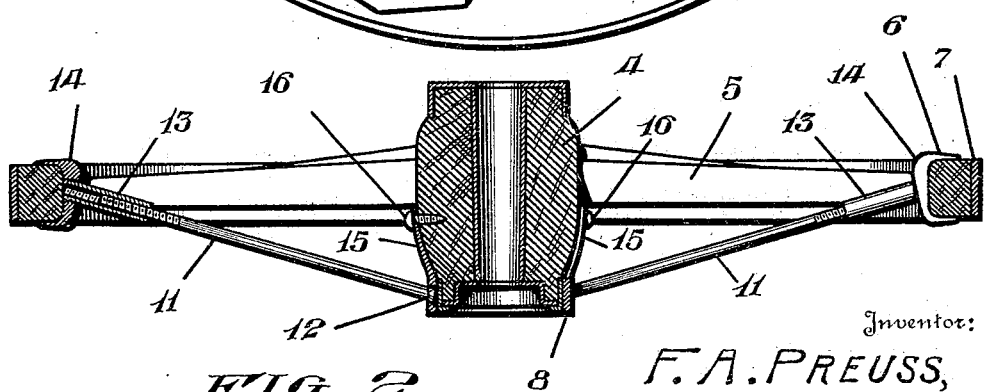

FRED A. PREUSS, OF HUMPHREY, NEBRASKA.

WHEEL-BRACING ATTACHMENT.

1,413,491. Specification of Letters Patent. Patented Apr. 18, 1922.

Application filed December 23, 1921. Serial No. 524,406.

*To all whom it may concern:*

Be it known that I, FRED A. PREUSS, a citizen of the United States, residing at Humphrey, in the county of Platte and State of Nebraska, have invented certain new and useful Improvements in Wheel-Bracing Attachments; and I do hereby declare the following to be a full, clear, and exact description of the invention, such as will enable others skilled in the art to which it appertains to make and use the same.

The present invention relates to an attachment for wheels, especially wooden wheels of the artillery type, for bracing and strengthening the wheel, as well as restoring the same to original shape, and the invention aims to provide a novel and improved device of that kind, which is also simple in construction and application, inexpensive to manufacture, and efficient and practical in use.

Another object of the invention is to provide such a device comprising a novel construction including saddles or members to fit the wheel felly, a band to embrace the hub, and brace or stay rods between said saddles and band.

With the foregoing and other objects in view, which will be apparent as the description proceeds, the invention resides in the construction and arrangement of parts, as hereinafter described and claimed, it being understood that changes can be made within the scope if what is claimed, without departing from the spirit of the invention.

The invention is illustrated in the accompanying drawing, wherein—

Figure 1 is a side elevation of wheel showing the attachment applied.

Fig. 2 is a diametrical section on the line 2—2 of Fig. 1.

The device can be made in different sizes for use on the different kinds of wagon and buggy wheels, and the like, and the wheel, as shown, is of conventional construction, comprising the hub 4, spokes 5, felly 6 and tire 7, the hub, spokes and felly being usually of wood and the tire a metal band. The attachment is especially useful for wooden wheels of the artillery type, although it might also be used on wire wheels and others. The wooden wheels, however, sometimes cause annoyance, owing to the warping of the wheel or the wheel getting out of shape, the spokes loosening, etc. The present attachment is thus especially useful on wooden wheels for bracing and strengthening the same as well as restoring the shape of the wheel.

The attachment comprises an adjustable spider having a central portion to embrace the hub of the wheel, adjustable arms, and members at the terminals of the arms to engage the wheel felly. Thus, the attachment has a central band 8 to embrace one end portion of the hub 4, and said band is split in order that it can be adjusted to fit hubs of different diameters, said band having the outstanding terminals 9 through which a bolt 10 or other clamping element is engaged for contracting the band to cause it to tightly embrace the hub. Brace or stay rods 11, forming the arms of the spider, have their inner ends formed with heads 12 seated within apertures in the band 8, and said heads and apertures are countersunk, for anchoring the rods to the band, without said heads projecting from the inner periphery of the band as might interfere with the band being placed or clamped on the hub. Said rods are thus swivelled to the band, in order that they can be rotated, and said rods or arms extend obliquely from the band toward the felly of the wheel, as seen in Fig. 2, to obtain a bracing action. As shown, there are four rods, although more or less can be used. The outer terminals of the rods are screw-threaded into nipples or tubular sockets 15 which have their outer ends screw-threaded into or otherwise secured to the saddles or felly engaging members 14. Said saddles or members are of U-shaped section to fit astride the felly from the inner periphery. By turning the rods 11, the arms of the spider can be elongated or shortened, for moving the saddles or members 14 away from or toward the band and hub.

In order to more securely retain the band on the hub, the band is provided at its inner edge with tongues 15 projecting therefrom toward the spokes, and said tongues are fastened by means of screws 16 or other securing elements to the hub, thereby preventing the band from slipping off the hub. The tongues 15 are bendable or resilient in order that they can be bent to fit against hubs of different sizes or shapes.

When the rods 11 are turned to move the saddles or members 14 toward the band, the device is readily placed on the wheel by slipping the band on the hub and positioning the saddles or members 14 within the felly. The band can then be clamped on the hub by tightening the bolt 10, and by fastening the tongues 15 to the hub by means of screws 16, or the like. The rods 11 are then turned in such a direction as to unscrew them partly from the nipples 13, which will force said nipples 13 and saddles 14 outwardly to bring the saddles into place astride the felly, and any desired compression can be applied by turning the rods 11 the required amount. The arms of the spider can therefore be given the desired compression for bracing and stiffening the wheel and restoring the shape thereof. The attachment will therefore enable the wheel to be used and its life lengthened, even after the wheel has gotten out of shape or the spokes loosened.

Having thus described the invention, what is claimed as new is—

1. A wheel bracing attachment comprising a hub band, felly engaging members, and arms between said band and members having rotatable connections with them and including screw-threads for obtaining an adjustment between said band and members.

2. A wheel bracing attachment comprising a hub band, saddles to fit astride a felly at the inner periphery thereof, and arms between said band and saddles and connected thereto, said arms each including members having screw-threaded connections and one member being rotatable to adjust the length of the arm.

3. A wheel bracing attachment comprising a hub band, felly engaging members, and rods having swivelled connection with the band and screw-threaded connections with said members.

4. A wheel bracing attachment comprising a hub band, felly engaging saddles, nipples secured to said saddles, and rods having swivel connections with said band and screw-threaded into said nipples.

5. A wheel bracing attachment comprising a split hub band having means for contracting it to embrace a hub, rods connected to said band, and members connected to the outer ends of said rods for engaging a wheel felly.

6. A wheel bracing attachment comprising a hub band having bendable tongues projecting therefrom to be secured to a hub, rods connected to the band, and members connected to the outer ends of the rods for engaging a wheel felly.

In testimony whereof I have signed my name to this specification in the presence of two subscribing witnesses.

FRED A. PREUSS.

Witnesses:
CHARLES PFEIFER,
W. E. GEHR.